United States Patent
Buzak et al.

[11] Patent Number: 6,016,032
[45] Date of Patent: Jan. 18, 2000

[54] PALC PANEL WITH WIRE ELECTRODES

[75] Inventors: Thomas S. Buzak; Kevin J. Ilcisin, both of Beaverton; Paul C. Martin, Sunriver, all of Oreg.; Hans J. G. A. Den Biggelaar; Jacob Bruinink, both of Eindhoven, Netherlands; Petrus Franciscus Gerardus Bongaerts, Waalre, Netherlands; Adrianus Leonardus Josephus Burgmans, Eindhoven, Netherlands; Babar Ali Khan, Ossining, N.Y.; Henri Roger Jules Richard Van Helleputte, Eindhoven, Netherlands

[73] Assignees: Tektronix, Inc., Wilsonville, Oreg.; Philips Electronics North America Corporation, Tarrytown, N.Y.

[21] Appl. No.: 08/990,693

[22] Filed: Dec. 15, 1997

[51] Int. Cl.7 .................................................... H01J 1/62
[52] U.S. Cl. ........................ 313/493; 313/491; 313/484; 445/24; 445/25
[58] Field of Search ..................................... 313/422, 491, 313/492, 493, 494, 495, 514, 484; 349/32, 160, 143; 315/169.4; 445/24, 25

[56] References Cited

U.S. PATENT DOCUMENTS

| | | | |
|---|---|---|---|
| 4,088,920 | 5/1978 | Siekanowicz et al. | 313/422 |
| 4,316,118 | 2/1982 | Anderson et al. | 313/422 |
| 4,727,284 | 2/1988 | Ohkoshi et al. | 313/497 |
| 5,764,001 | 6/1998 | Khan et al. | 313/582 |
| 5,831,397 | 11/1998 | Stevens et al. | 315/366 |
| 5,847,797 | 12/1998 | Van Dijk | 344/158 |

*Primary Examiner*—Vip Patel
*Assistant Examiner*—Michael J. Smith
*Attorney, Agent, or Firm*—John D. Winkelman; John Smith-Hill

[57] ABSTRACT

A channel member for a PALC panel has a channel in its surface and a wire in the channel as an electrode of the PALC panel.

10 Claims, 3 Drawing Sheets

PALC PANEL WITH WIRE ELECTRODES

BACKGROUND OF THE INVENTION

This invention relates to plasma addressed liquid crystal (PALC) panel with wire electrodes.

U.S. Pat. No. 5,077,553 discloses apparatus for addressing data storage elements. A practical implementation of the apparatus shown in U.S. Pat. No. 5,077,553 is illustrated schematically in FIG. 1 of the accompanying drawings.

The display panel shown in FIG. 1 comprises, in sequence from below, a polarizer 2, a channel member 4, a cover sheet 6 (commonly known as a microsheet), a layer 10 of electro-optic material, an array of parallel transparent data drive electrodes (only one of which, designated 12, can be seen in the view shown in FIG. 1), an upper substrate 14 carrying the data drive electrodes, and an upper polarizer 16. In the case of a color display panel, the panel includes color filters (not shown) between the layer 10 and the upper substrate 14. The panel may also include layers for improving viewing angle and for other purposes. The channel member 4 is typically made of glass and is formed with multiple parallel channels 20 in its upper main face. The channels 20, which are separated by ribs 22, are filled with an ionizable gas, such as helium. An anode 24 and a cathode 26 are provided in each of the channels 20. The channels 20 are orthogonal to the data drive electrodes and the region where a data drive electrode crosses a channel (when viewed perpendicularly to the panel) forms a discrete panel element 28. Each panel element can be considered to include elements of the layer 10 and the lower and upper polarizers 2 and 16. The region of the upper surface of the display panel that bounds the panel element constitutes a single pixel 30 of the display panel.

When the anode 24 in one of the channels is connected to a reference potential and a suitably more negative voltage is applied to the cathode 26 in that channel, the gas in the channel forms a plasma which provides a conductive path to the reference potential at the lower surface of the cover sheet 6. If a data drive electrode is at the reference potential, there is no significant electric field in the volume element of electro-optic material in the panel element at the crossing of the channel and the data drive electrode and the panel element is considered to be off, whereas if the data drive electrode is at a substantially different potential from the reference potential, there is a substantial electric field in that volume element of electro-optic material and the panel element is considered to be on.

It will be assumed in the following description, without intending to limit the scope of the claims, that the lower polarizer 2 is a linear polarizer and that its plane of polarization can be arbitrarily designated as being at 0° relative to a reference plane, that the upper polarizer 16 is a linear polarizer having its plane of polarization at 90°, and that the electro-optic material is a twisted nematic liquid crystal material which rotates the plane of polarization of linearly polarized light passing therethrough by an angle which is a function of the electric field in the liquid crystal material. When the panel element is off, the angle of rotation is 90°; and when the panel element is on, the angle of rotation is zero.

The panel is illuminated from the underside by an extended light source 34 which emits unpolarized white light. A rear glass diffuser 18 having a scattering surface may be positioned between the light source and the panel in order to provide uniform illumination of the panel. The light that enters a given panel element from the source is linearly polarized at 0° by the lower polarizer 2 and passes sequentially through the channel member 4, the channel 20, the cover sheet 6, and the volume element of the liquid crystal material toward the upper polarizer 16 and a viewer 32. If the panel element is off, the plane of polarization of linearly polarized light passing through the volume element of liquid crystal material is rotated through 90°, and therefore the plane of polarization of light incident on the upper polarizer element is at 90°. The light is passed by the upper polarizer element and the pixel is illuminated. If, on the other hand, the panel element is on, the plane of polarization of the linearly polarized light is not changed on passing through the volume element of liquid crystal material. The plane of polarization of light incident on the upper polarizer element is at 0° and therefore the light is blocked by the upper polarizer element and the pixel is dark. If the electric field in the volume element of liquid crystal material is intermediate the values associated with the panel element being off and on, light is passed by the upper polarizer element with an intensity which depends on the electric field, allowing a gray scale to be displayed.

In a practical implementation of the PALC display panel, the channel member 4 is etched back around the periphery of the viewing area in order to provide a plateau 36 in which the channels 20 are formed, and the cover sheet 6 is secured to the channel member by an endless frit bead 38 in a rabbet 40 extending around the periphery of the plateau. An upper substrate assembly, including the upper substrate 14 and the data drive electrodes 12 carried thereby, is attached to the channel member 4 by means of a glue bead 42.

The channel member of a PALC panel can be fabricated using conventional photolithographic techniques. Specifically, an etch mask having slot-form apertures in accordance with the desired pattern of channels is formed on the upper surface of a glass plate. The glass plate is exposed to a suitable etchant through the mask, and the channels are formed in the plate.

The electrodes in the channels of a PALC panel are typically formed using conventional photolithographic techniques. A blanket layer of the electrode metal is deposited over the upper surface of the channel member and is selectively etched to define the desired pattern of electrodes.

SUMMARY OF THE INVENTION

According to a first aspect of the present invention there is provided an intermediate structure in manufacture of a PALC panel, comprising a channel member having at least one channel in a surface thereof and a wire of length at least as great as that of the channel, the wire being located in the channel.

According to a second aspect of the present invention there is provided a method of making a channel assembly for a PALC panel, comprising providing a channel member having at least one channel in a surface thereof, providing a wire of length at least as great as that of the channel, and placing the wire in the channel as an electrode of the PALC panel.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals designate corresponding elements.

DETAILED DESCRIPTION

Figure 1:
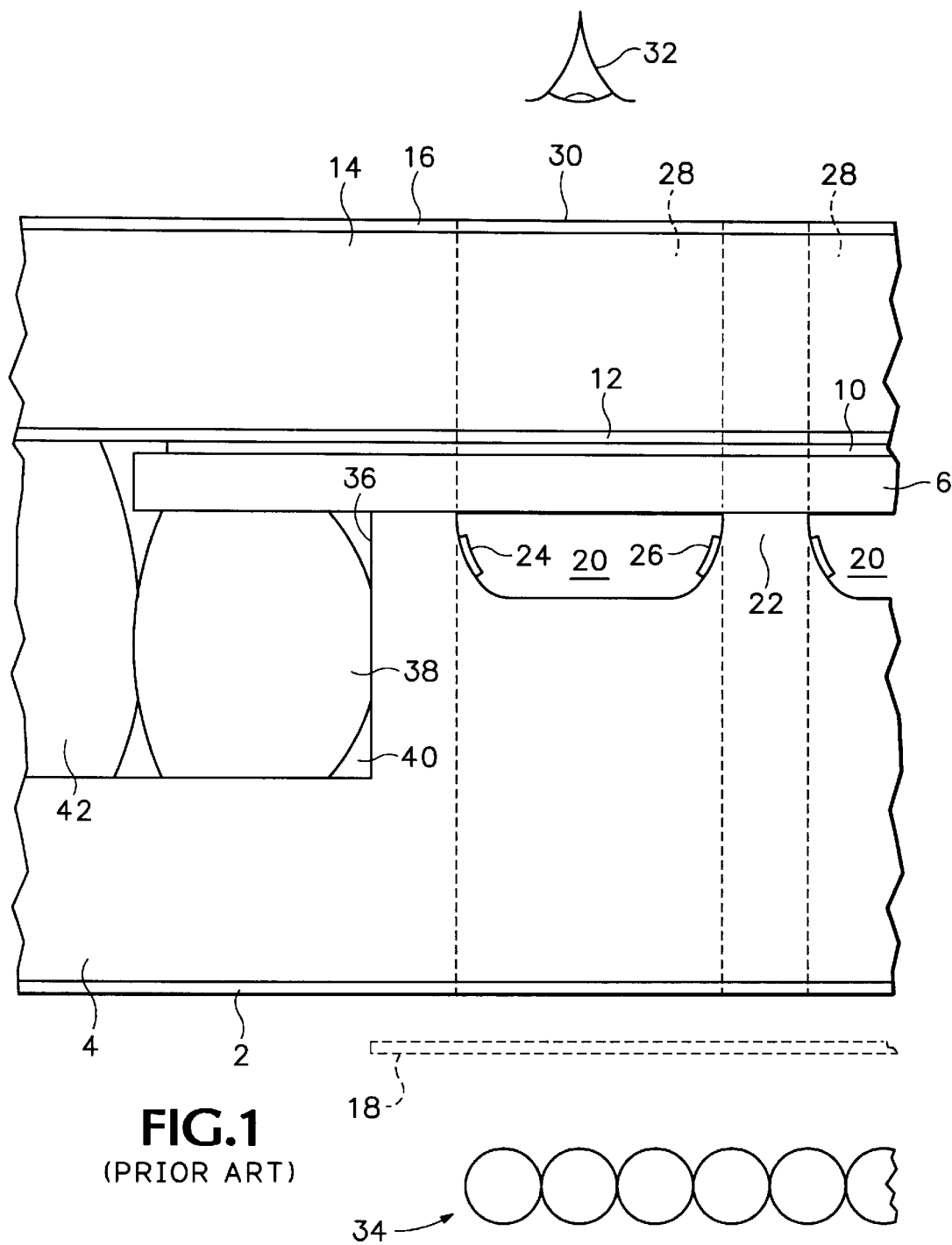
FIG. 1 is a partial sectional view of a PALC display panel in accordance with the prior art.
Figure 2A:
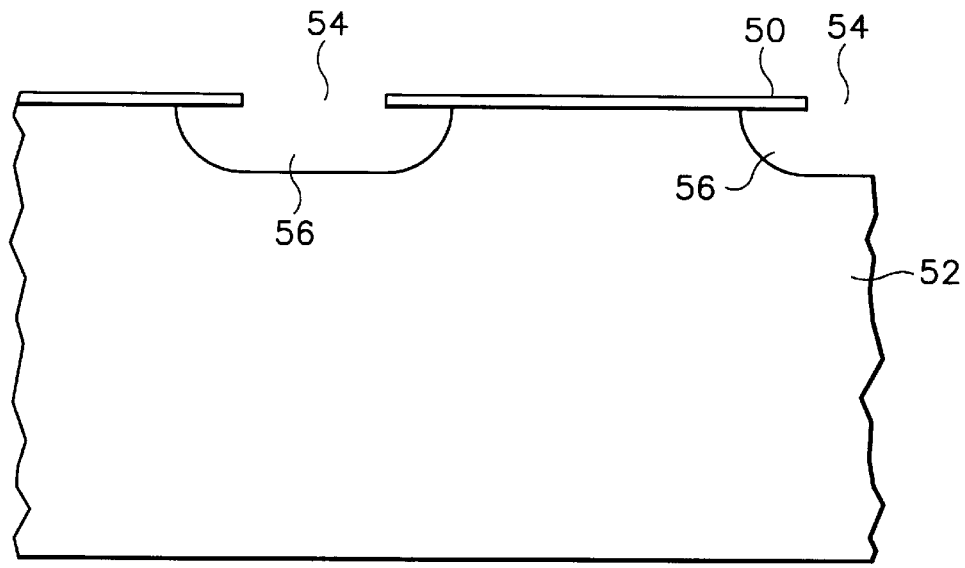
FIGS. 2A, 2B and 2C are partial sectional views illustrating successive steps in manufacture of a PALC display panel in accordance with the present invention.
Figure 2B:
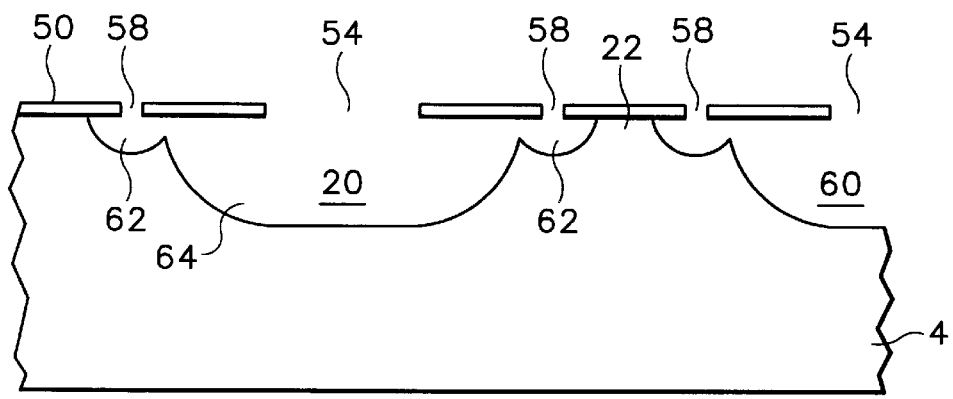
Figure 2C:
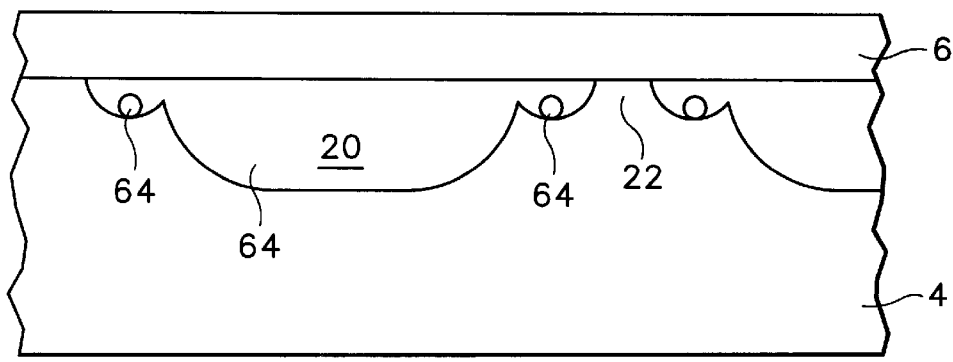
Figure 3:
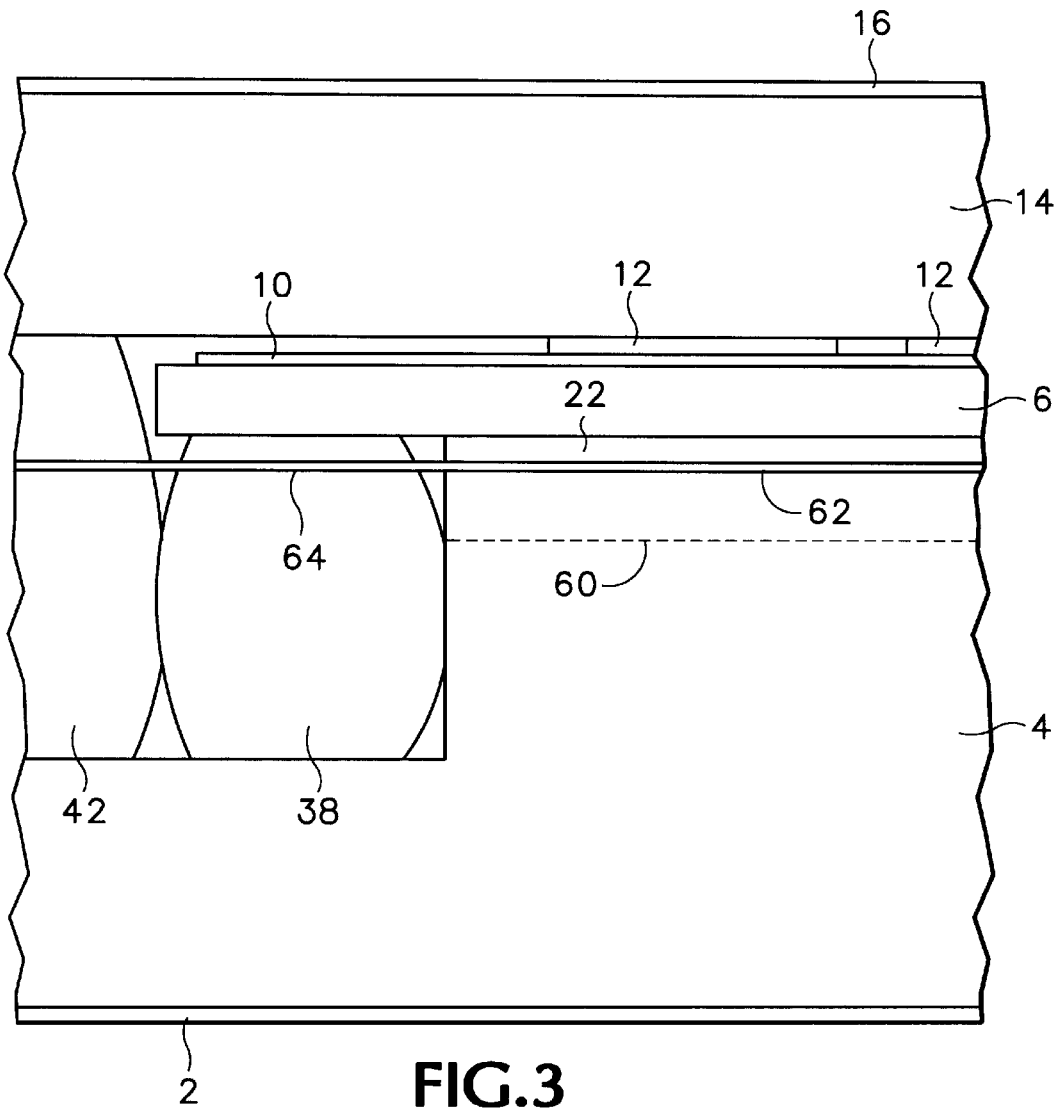
FIG. 3 is a partial sectional view illustrating the PALC panel shown in FIGS. 2A–2C, taken on a line perpendicular to the section line of FIGS. 2A–2C.

Referring to FIG. 2A, a layer 50 of a suitable etch resist is formed in the usual fashion over the upper surface of a glass plate 52 and slot form apertures 54 at the desired spatial frequency of the channels in the finished channel member are formed in the etch resist layer to define a primary etch mask. The glass plate 52 is exposed to a suitable etchant through the primary etch mask and channels 56 are formed in the glass plate. However, etching is interrupted before the channels are formed to the desired final depth and the primary etch mask is processed to form additional narrow slot form apertures 58 (FIG. 2B) adjacent each side of each existing aperture 54 and thereby define a secondary mask. Etching is resumed through the secondary mask, and continued etching has the effect of modifying the configuration of the channel so that the finished channel 20 is composed of a relatively wide main groove 60 and two relatively narrow electrode grooves 62 along opposite sides thereof. The remainder of the masking layer is then removed. The channel member 4 is then complete.

A metal wire 64 is placed in each of the electrode grooves 62. The cover sheet 6 is placed over the top surface of the channel member and is secured to the channel member by the frit seal 38, which also serves to secure the wires 64 in the respective electrode grooves 62. The further steps in assembly of the display panel may then carried out in the usual way.

The minimum diameter of the wire 64 is selected so that the wire will have sufficient strength that it will be self-supporting and will not break during placement in the electrode groove. In this regard, it should be noted that it might be desirable to hold the wire under tension when placing it in the electrode groove 62. The diameter of the wire may be in the range from 10 to 150 μm and is preferably in the range from about 25 to about 50 μm.

If the wire diameter is 25–50 μm it is expected that the spatial period of the channels would be at least 0.5 mm in order for the channels to have a large enough aperture. The channel member for a high addressability display, such as high definition television, would require approximately 1000 channels. If the spatial period of the channels were 0.5 mm, the height of a panel having about 1000 channels would be about 50 cm. In a display panel having a height of 50 cm and an aspect ratio of 16:9, the length of the channel is approximately 89 cm. Accordingly, each wire must be at least 89 cm in length.

The wire may be a pure metal, such as nickel or copper, or a composite metal containing emitters, such as yttrium, barium or thorium. The wire may have a conductive core, such as copper, and a protective coating of a hard material such as a rare earth hexaboride.

Figure 4:
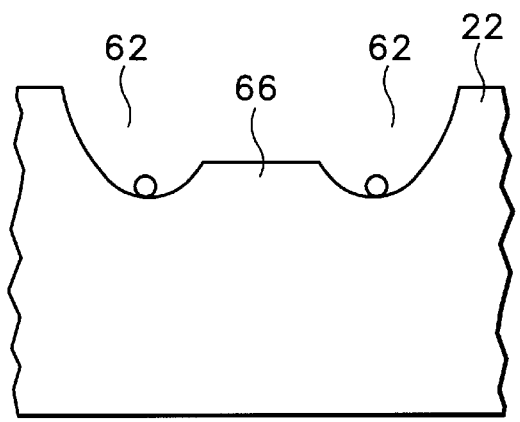
FIG. 4 is a partial sectional view illustrating an alternative channel configuration.

FIG. 4 illustrates a modification of the channel member described with reference to FIGS. 2A–2C and 3. In accordance with FIG. 4, the electrode grooves 62 are deeper and are separated by a ridge 66. In the channel member shown in FIG. 4, the aperture of the channel depends on the width of the ridge.

Figure 5:
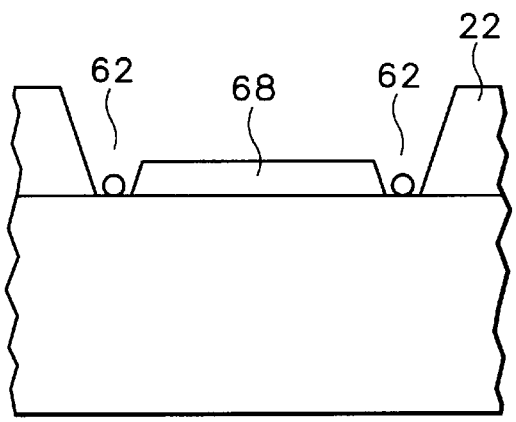
FIG. 5 is a view similar to FIG. 4 illustrating a channel member formed by an additive process.

Referring to FIG. 5, the grooves 62 can be formed by an additive process, in which material is deposited on the top flat surface of the glass plate to form the ribs 22 between the channels and a ridge 68 is formed in each channel to define the electrode grooves.

The purpose of the electrode groove is to facilitate placement of the wire electrode and to make sure that the electrode remains in place. With appropriate fixturing, the electrode groove may be omitted and the electrode placed in the channel close to its base. For example, metal pads may be deposited on the channel member at each end of the channel and the wire may be attached to the metal pads and held under tension in the channel.

It will be appreciated that the invention is not restricted to the particular embodiment that has been described, and that variations may be made therein without departing from the scope of the invention as defined in the appended claims and equivalents thereof.

We claim:

1. An intermediate structure in manufacture of a PALC panel, comprising a channel member having at least one channel in a surface thereof and a wire of length at least as great as that of the channel, the wire being located in the channel.

2. An intermediate structure according to claim 1, wherein the channel is composed of a relatively wide, elongate groove and at least one relatively narrow groove extending lengthwise of the relatively wide groove along an edge thereof and the wire is located in the relatively narrow groove.

3. An intermediate structure according to claim 1, comprising first and second wires each of length at least as great as that of the channel, and wherein the first and second wires extend in spaced parallel relationship along the channel.

4. An intermediate structure according to claim 3, wherein the channel is composed of a relatively wide, elongate groove and first an second relatively narrow grooves extending lengthwise of the relatively wide groove along opposite respective edges thereof and the first and second wires are located in the first and second grooves respectively.

5. An intermediate structure according to claim 1, further comprising a cover sheet over said surface of the channel member and attached to the channel member around the periphery thereof by a frit seal, and wherein the wire is held in position in the channel by the frit seal.

6. A method of making a channel assembly for a PALC panel, comprising:
   (a) providing a channel member having at least one channel in a surface thereof,
   (b) providing a wire of length at least as great as that the channel, and
   (c) placing the wire in the channel as an electrode of the PALC panel.

7. A method according to claim 6, wherein the channel in the surface of the channel member provided in step (a) is composed of a relatively wide, elongate groove and a relatively narrow groove extending lengthwise of the relatively wide groove along an edge thereof and step (c) comprises placing the wire in the relatively narrow groove.

8. A method of making a channel assembly for a PALC panel, comprising:
   (a) providing a channel member having at least one channel in a surface thereof, (b) providing first and second wires each of length at least as great as that of the channel, and (c) placing the first and second wires in the channel as electrodes of the PALC panel.

9. A method according to claim 8, wherein the channel in the surface of the channel member provided in step (a) is composed of a relatively wide, elongate groove and first and second relatively narrow grooves extending lengthwise of the relatively wide groove along opposite respective edges thereof and step (c) comprises placing the first and second wires in the first and second relatively narrow grooves respectively.

10. A method according to claim 6, further comprising employing a frit seal to attach a cover sheet to the channel member around the periphery thereof, and wherein the frit seal secures the wire in position in the channel.

* * * * *